United States Patent
Gunsaulus et al.

[19]

[11] Patent Number: 5,914,970
[45] Date of Patent: Jun. 22, 1999

[54] COMPUTER MEMORY SYSTEM PROVIDING PARITY WITH STANDARD NON-PARITY MEMORY DEVICES

[75] Inventors: Richard S. Gunsaulus, Highland Heights; Otomar S. Schmidt, Richmond Heights, both of Ohio

[73] Assignee: Allen-Bradley Company, LLC, Milwaukee, Wis.

[21] Appl. No.: 08/921,730

[22] Filed: Aug. 27, 1997

[51] Int. Cl.[6] .............................. G06F 11/10; H03M 13/00
[52] U.S. Cl. ......................................... 371/51.1; 371/49.1
[58] Field of Search .................................. 371/51.1, 49.1, 371/21.1

[56] References Cited

U.S. PATENT DOCUMENTS 5,485,572   1/1996   Overley ............................... 395/182.19

*Primary Examiner*—Phung M. Chung
*Attorney, Agent, or Firm*—Keith M. Baxter; John M. Miller; John J. Horn

[57] ABSTRACT

A memory system uses standard memory devices not normally supporting parity bits. Parity bits for multiple memory devices are stored in a dedicated parity device shared among multiple memory devices. Inadvertent erasure of the parity information, when writing to a single memory device, is prevented by a prereading of the parity device prior to a writing to the single memory device. Special circuitry stores the preread parity information and merges it back with the calculated parity bit for the written data to preserve complete parity information.

7 Claims, 3 Drawing Sheets

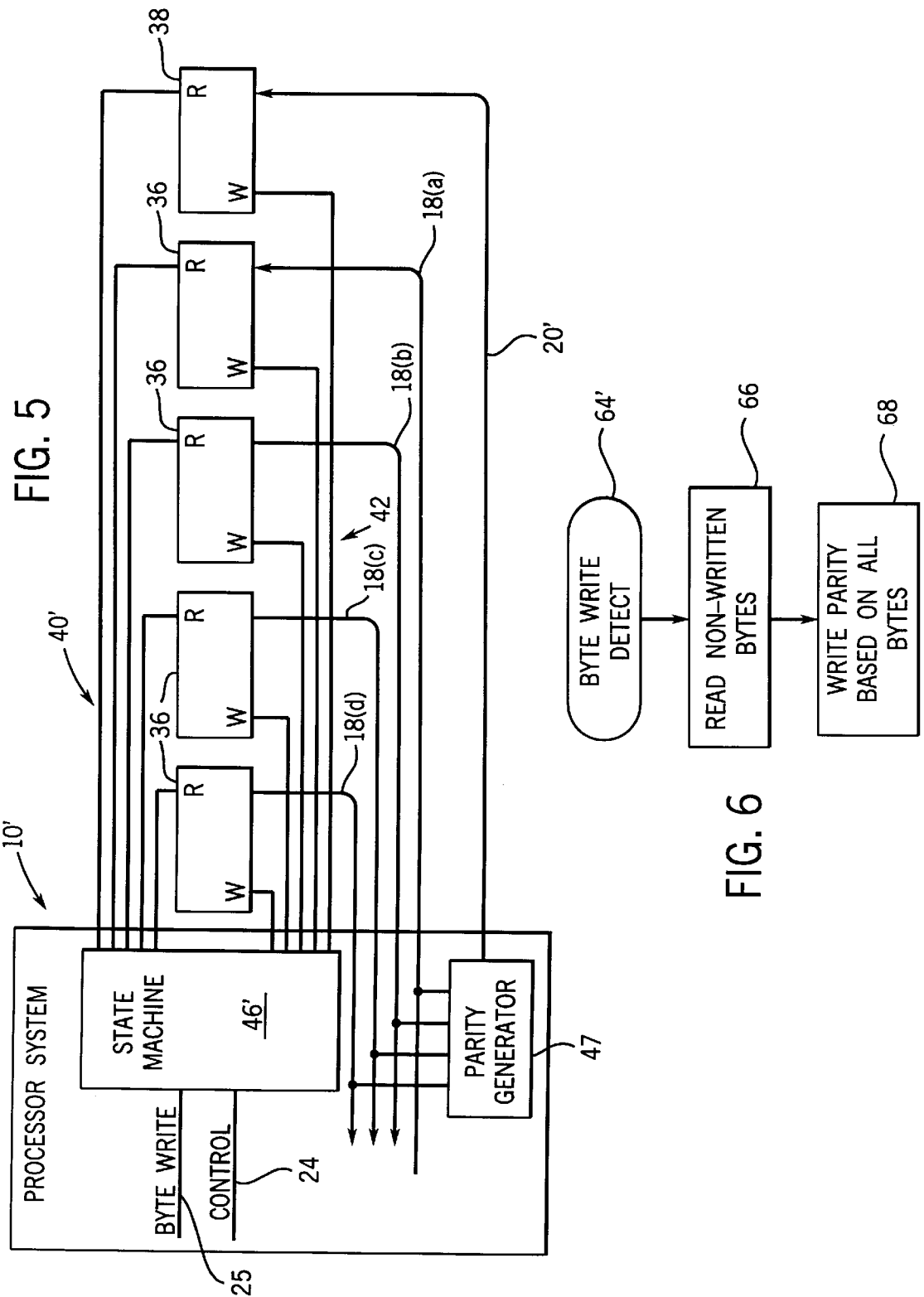

COMPUTER MEMORY SYSTEM PROVIDING PARITY WITH STANDARD NON-PARITY MEMORY DEVICES

BACKGROUND OF THE INVENTION

Computer memories used for high reliability control systems and the like, incorporate one or more parity bits with each addressable memory word. Parity bits allow the detection of errors in stored data caused by an inadvertent changing of one or more bits in the stored data. The errors may be caused, for example, by a minor failure of the memory storage circuitry or a failure in the process of reading or writing of the memory.

A single parity bit permits the detection of an error in a single bit or odd number of bits in a memory word of arbitrary length. Using even parity, the parity bit may be set if the number of set bits in the memory word is odd and reset otherwise. If an error occurs in one bit of the memory word, the number of set bits will no longer correspond to the state of the parity bit and an error will be indicated. Multiple parity bits permit detection and correction of multiple errors in a memory word according to techniques well understood in the art.

Memory devices providing parity typically provide an extra bit of storage for the parity bit. Thus, for a computer using eight-bit memory words, a parity memory device would provide nine bits of storage at each address.

In industrial controllers, memory errors are a significant concern because they may directly affect the operation of a physical process being controlled. Further, some industrial control systems employ redundant control architectures in which a fault in a primary controller causes a secondary controller to assume control. Memory parity bits can be used in such redundant systems to trigger a switch over of control between primary and secondary controllers based on memory errors that are otherwise difficult to detect.

The market for memory devices is increasingly driven by the demand for personal computer systems. Many such personal computer systems do not use parity bits. As a result, the availability of parity memory devices in the future is uncertain.

BRIEF SUMMARY OF THE INVENTION

The present invention provides a memory system that uses non-parity memory devices to provide for the storage of parity bits. One standard memory device is dedicated to storing the parity bits for a number of other standard memory devices providing data storage. For example, one eight-bit device is used to provide four parity bits to four other eight bit devices making up a thirty-two bit word. This approach of sharing one device for parity storage reduces the number of memory devices needed for the parity storing device.

In order that a "writing" of one data storage device doesn't corrupt the parity bits for the other memory devices (when the associated parity bit is saved in the parity storage device), a special control circuit stalls the writing to the data storage device in order to collect the pre-existing parity bits. These pre-existing parity bits are then combined with the new parity bit and the writing to the data storage device is completed.

Specifically, the present invention provides a memory system for use with a processor that writes and reads data and parity to and from memory. The system includes a plurality of writeable data memory elements and parity memory elements. Each parity memory element holds multiple parity bits associated with data of different data memory elements. Control circuitry detects the processor's initiation of a write of data to a particular data memory element together with a write of at least one parity bit to a particular parity memory element. In response to that detection, the control circuitry suspends the processor's writing of data and parity to determine parity bits for the data of the other data memory elements associated with the particular parity memory element. The processor's writing of the data to the particular data memory element is then released and the parity bits for all the associated data memory elements are written to the parity memory element.

Thus, it is one object of the invention to allow a single multi-bit memory device to store parity bits for a number of other memory devices. In order to avoid corruption of parity data when a given parity bit is written, all the other parity bits are also collected and written at the same time.

The multiple parity bits may be determined by combining the parity bits from the particular parity memory element (prior to the writing of data) with the parity bit to be written during the writing of data.

Thus, it is another object of the invention to make use of the parity bit naturally generated by the processor in the writing operation by simply adding in the previously existing parity bits.

The memory system may include an address decoder circuit connecting the control circuitry, the data memory elements, and the parity memory elements to cause a reading of a parity memory element associated with any data memory element when the data memory element is read.

Thus, it is another object of the invention to provide a simple circuit for reading out previously stored parity bits. The control circuit, by stalling the writing of the particular data memory element, may use the current state of the address lines to read out the parity data element simply by asserting the read line. The data read-out is discarded; only the parity information is saved.

The control circuitry may suspend the writing of the data and parity unless all data memory elements associated with a particular parity memory element are being written to by the processor.

Thus, it is another object of the invention to eliminate delay in write operations when multiple standard memory devices are used to construct long word memories. When the entire long word is being written to (including all the data memory elements associated with a given parity memory element), there is no need to read out the parity data and this step may be eliminated speeding operation of a computer.

The foregoing and other objects and advantages of the invention will appear from the following description. In this description, reference is made to the accompanying drawings which form a part hereof and which there is shown by way of illustration a preferred embodiment of the invention. Such embodiment does not necessarily represent the full scope of the invention, however, and reference must be made therefore to the claims interpreting the scope of the invention.

BRIEF DESCRIPTION OF THE SEVERAL VIEWS OF THE DRAWINGS

FIG. 5 is a figure similar to that of FIG. 3 showing an alternative embodiment of the invention; and FIG. 6 is a figure similar to FIG. 4 for the embodiment of FIG. 5.

DETAILED DESCRIPTION OF THE INVENTION

Figure 1:
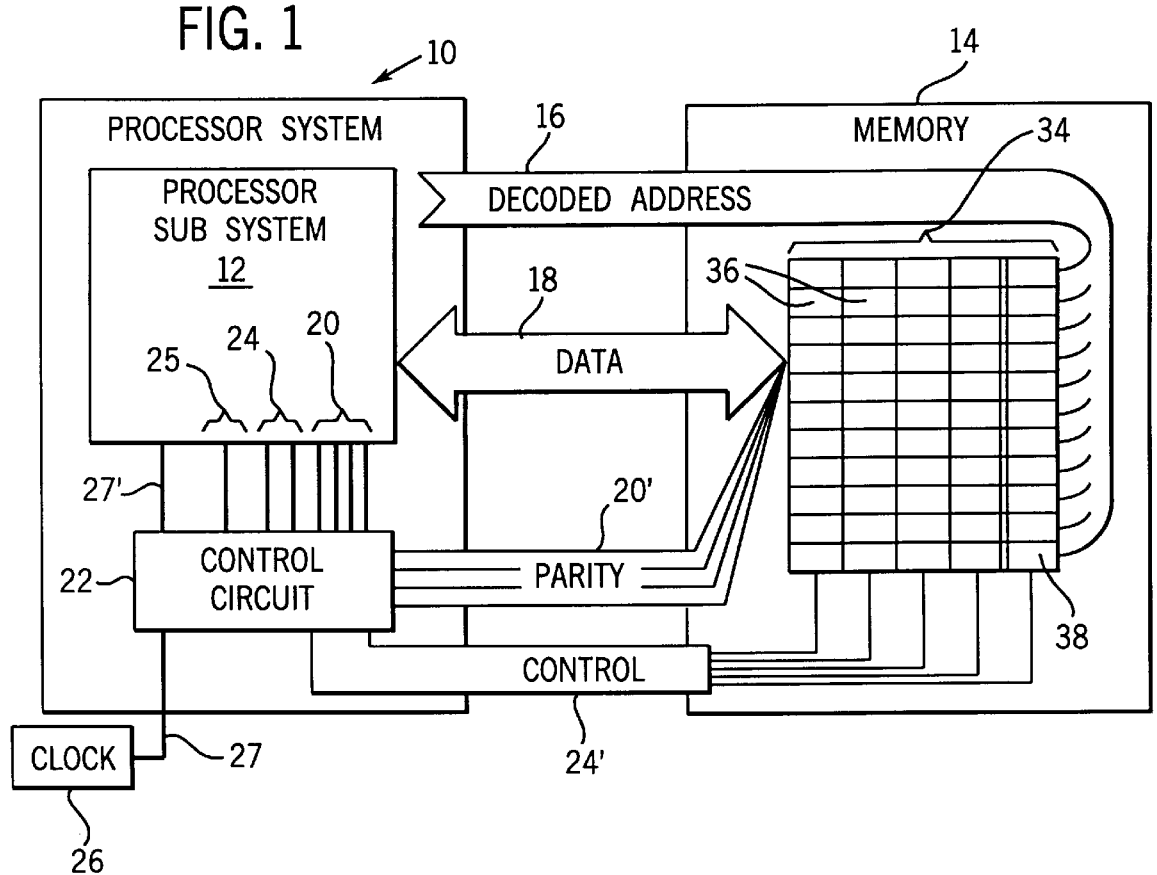
FIG. 1 is a block diagram of a processor employing parity generation/checking and a parity storing memory, showing the control circuit of the present invention communicating with the processor and that memory.

Referring now to FIG. 1, a processor system 10 includes a processor subsystem 12 (not shown) communicating with a memory 14 to fetch instructions and data from the memory 14 and write data to the memory 14 according to methods well known in the art. The processor subsystem 12 receives memory addresses from the processor and decodes them to decoded addresses sent to the memory 14 and generates parity data and various control signals to be described.

Figure 2:
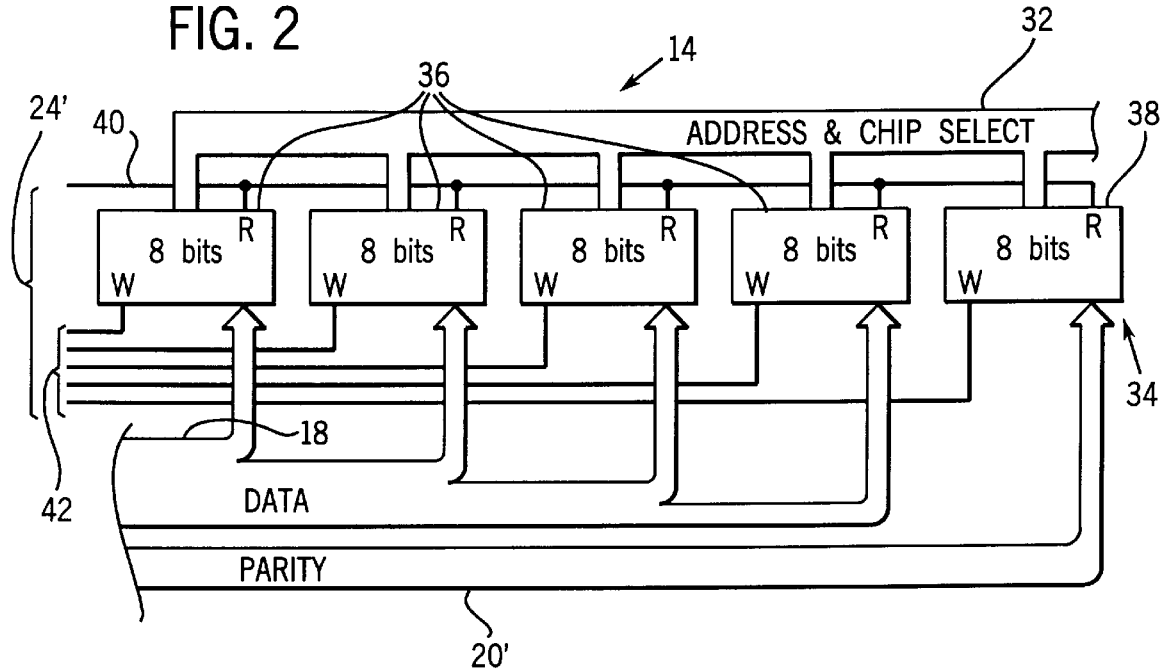
FIG. 2 is a fragmentary detailed view of the memory of FIG. 1 showing the interconnection of a number of standard memory devices to provide for the parity storing memory.

Referring now also to FIG. 2, memory 14 is arranged as a series of memory words 34 comprised of one or more data bytes 36 associated with a parity byte 38. In the preferred embodiment, each data byte 36 and the parity byte 38 are all separate standard memory devices. As shown, each memory device associated with data bytes 36 and parity byte 38 forms a column whereas the memory words 34 are shown as rows.

For example, each memory word 34 may be thirty-two bits long. Each data byte 36 is eight bits long and the parity byte 38 is eight bits long. The four parity bits for the four data bytes 36 of each memory word 34 are then stored in the parity byte 38, leaving four bits of the parity byte uncommitted.

The processor subsystem 12 communicates with the memory 14 by means of decoded address lines 16 identifying a particular memory word 34 of memory 14 to be read from or written to the particular device.

The processor subsystem 12 also communicates with the memory via data lines 18 (passed through from the processor) transmitting the data from the data bytes 36 of the particular memory word 34 in a case of a reading of the memory 14 and to the data bytes 36 of the particular memory word 34 in case of a writing of the memory 14. Parity lines 20 passing through control circuitry 22 (as will be described below) connect with the memory 14 by lines 20' and allow writing to or reading from the parity byte 38 addressed by the processor subsystem 12. The parity lines 20' are four bits wide in this example and the data lines 18 are 32 bits wide with each of the data bytes 36 providing a successive eight bits of the 32 bit word.

Control lines 24 also pass between the processor subsystem 12 and the memory 14, via the control circuit 22, on lines 24 (from the processor subsystem 12 to the control circuit 22, then on lines 24' to the memory 14, including for example, read and write lines (to be described).

A clock 26 provides a clock signal on line 27 through control circuit 22 to line 27' to processor subsystem 12 for the timing of its internal operations according to well known techniques. Processor subsystem 12 also provides decoded "byte-write" signals 25 to the control circuit 22 which include the least significant bits of address lines 16: A0 and A1, indicating that the processor will be writing data to an individual data byte 36 (as opposed to the entire memory word 34), as will be described below and indicating which of the data bytes 36 will be written to in the memory word 34.

The decoded address lines 16 provide a series of memory select lines 32 (and sub addresses) as is well understood in the art and which enable individual devices of the memory 14 for reading or writing to a single memory word 34. Typically, the decoded address 16 includes only the higher order address bits and the lower ordered address bits are decoded on the devices themselves.

Once selected, the memory devices of the data bytes 36 and parity byte 38 may receive a read signal through read line 40 causing the devices to output the contents of the data bytes 36 through data lines 18 and output the contents of the parity byte 38 through parity lines 20' for the memory word 34.

Alternatively, each of the data bytes 36 or the parity byte 38 of the addressed memory word 34 may be written to separately by means of write lines 42.

When an entire memory word 34 is read through read lines 40, the parity bits of the parity byte 38 are received over parity lines 20 by the processor subsystem 12 and reviewed by the circuitry of processor subsystem 12 to detect a memory error. When the entire memory word 34 is written to, the processor subsystem 12 computes parity bits for each of the bytes 36 and transmits them over parity lines 20 to be stored in the parity byte 38. These actions take place without action by the control circuit 22 or processor.

When a "byte-write" instruction occurs in which only one data byte 36 of the memory word 34 is written to, the parity bit associated with that data byte 36 will be calculated by the processor subsystem 12 and forwarded on the parity lines 20. However, the parity of the other data bytes 36 associated with the given memory word 34 will not be computed by the processor subsystem 12 which does not have the data of the other data bytes 36. Accordingly, a simple writing of the calculated parity bit to the parity byte 38 of the addressed memory word 34 may effectively erase the status of the parity bits for the other data bytes 36 associated with the addressed memory word 34. If byte-writes are allowed, the ability to use a standard memory device for storing parity of multiple data bytes is compromised.

Figure 3:
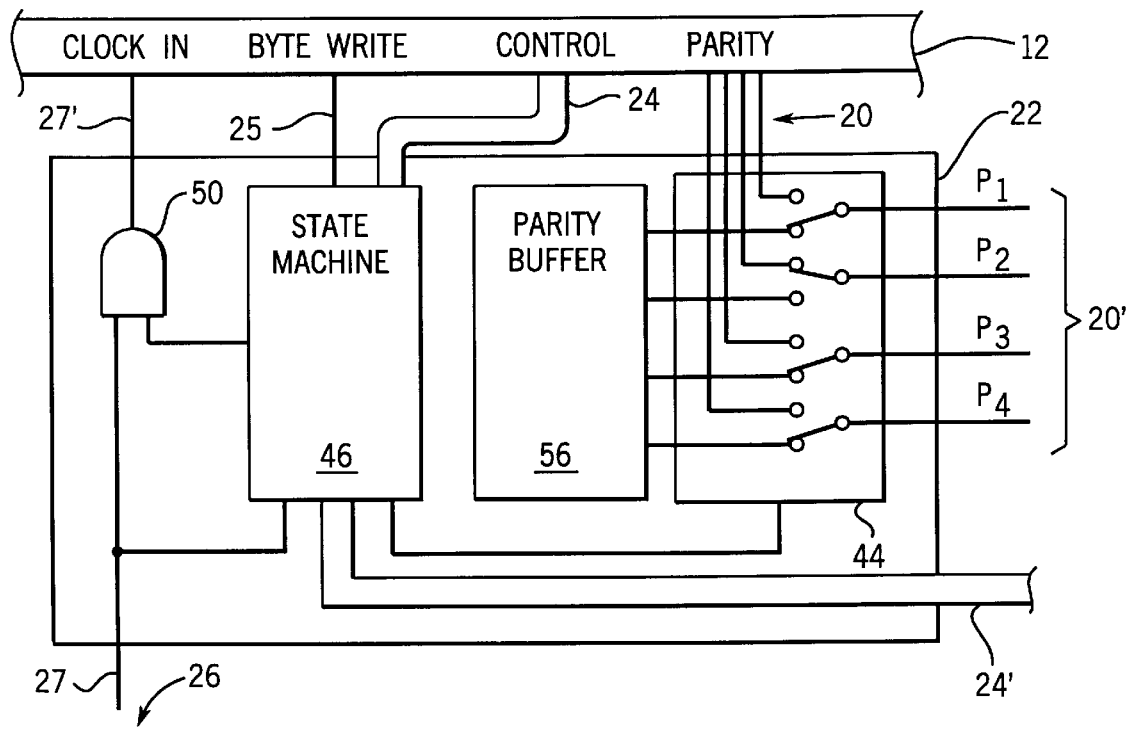
FIG. 3 is a detailed schematic view of the control circuit of FIG. 1 having a state machine, parity buffer and a logic switch, and showing communication with the processor and memory through a number of signal lines, including parity and control lines.

Referring now to FIGS. 1 and 3, in order to address this problem, the present invention provides control circuit 22 for detecting a byte-write operation and determining the parity bits to be stored in the parity byte 38 during the byte-write operation. As mentioned, control circuit 22 receives the parity lines 20 from the processor subsystem 12, control lines 24, a decoded byte-write signal 25 indicating that a byte-write operation is taking place and receives a clock signal on line 27 from the clock 26 and provides a clock signal on line 27' to processor subsystem 12.

During normal operation of the processor subsystem 12 in the absence of a byte-write instruction being executed by processor subsystem 12, parity lines 20 from the processor subsystem 12 are received by a logic switch 44 controlled by state machine 46 to connect parity lines 20 directly to parity lines 20' without intervention. Likewise, control lines 24 are passed through to control lines 24' by the state machine 46 and clock signal on line 27 is passed through to clock signal line 27', effectively eliminating the control circuit 22 from the processor system 10.

Figure 4:
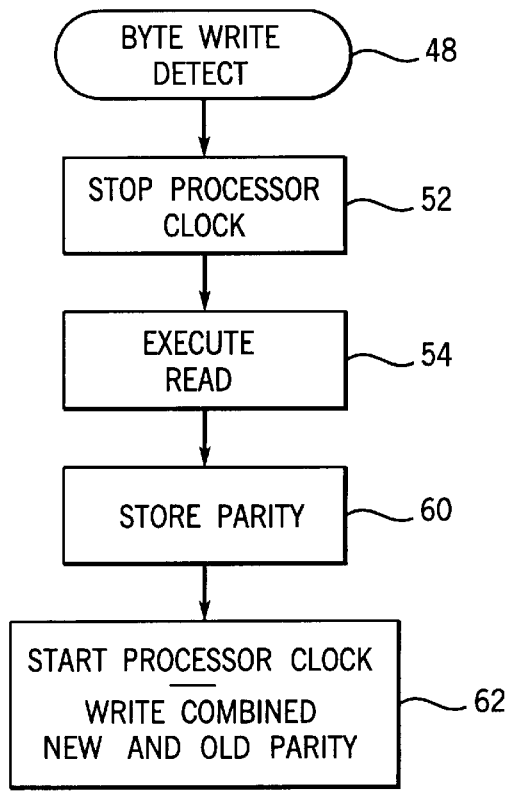
FIG. 4 is a flowchart showing the operation of the state machine of FIG. 3.

Referring now to FIG. 4, when a byte-write instruction has been decoded by the processor subsystem 12 and detected by the state machine 46 reading byte-write signal 25 as indicated by process block 48, then the state machine 46 operates to freeze the clock signal on line 27 from being received by the processor subsystem 12 by disabling gate 50 as indicated by process block 52.

Freezing the clock received by the processor subsystem 12 freezes operation of the processors 12 after the address lines 16 are latched to the proper address of the memory word 34 for the byte-write but before the write signal over control lines 24 is transmitted to the memory 14.

The state machine 46, executing process block 54, next initiates a read of the entire memory word 34 addressed by the processor subsystem 12 by activating read line 40 as shown in FIG. 2. The memory 14 responds by returning data for the addressed memory word 34 over data lines 18 (which is ultimately ignored) and returning parity data for the addressed memory word 34 over parity lines 20'.

The state machine 46 communicates with the logic switch 44 to switch bi-directional parity lines 20' on an individual basis either to connect parity lines 20' with parity lines 20 or to connect them with the parity buffer 56, the latter being a four-bit memory register capable of storing in parity bits and transmitting out those stored values under the control of the state machine 46. At this time, the logic switch 44 is switched by the state machine 46 so that the parity date received over lines 20' is transmitted to a parity buffer 56 and stored there as indicated by process block 60.

The state machine 46 now switches the logic switch 44 so that the data of the parity buffer 56 may be sent out over the parity lines 20' for all data bytes 36 of the addressed memory word 34 except for the data byte 36 that is the subject of the byte-write instruction. As depicted in FIG. 3, the second byte of the memory word 34 is the byte being written to with the byte-write instruction. Hence parity bits $P_1$, $P_3$ $-P_4$ are received by memory 14 on lines 20' through logic switch 44 directly from parity buffer 56, whereas line $P_2$ is received directly from the processor subsystem 12.

With the logic switch 44 thus configured, the state machine 46 releases the line 27' and the processor subsystem 12 proceeds with its byte-write generating the necessary parity bit for $P_2$ and causing the writing of not only the single data byte 36 but also of the parity bits into parity byte 38 as indicated by process block 62.

Thus the present invention modifies processor operation only during a byte-write cycle to pre-store those parity bits which might be lost in a writing of the parity byte 38. Those parity bits are then merged with the calculated parity bit for the byte being written to provide a complete writing of parity bits for all bytes on the occurrence of any byte-write of an individual byte.

Referring now to FIG. 5, in a second embodiment, parity buffer 56 may be eliminated by using the storage capabilities of the memory devices 36 themselves. In this case, a separate read line 40' must be provided to each device 36 and 38. A new state machine 46' upon receiving byte-write signals 25 activates the write line 42 of the particular device 36 being written to by the byte-write operation (data line 18a) and activates the read lines for the remaining devices 36 so that their contents may be read out (e.g. over data lines 18b, 18c, and 18d).

The lines 18a through 18d will now contain the data for each of the devices 36 either being read out or written to and an attached parity generator 47 may be used to generate a parity over parity data lines 20' which connect to the parity device 38 whose write line 42 is activated by the state machine 46'.

Thus referring to FIG. 6, at first process block 64', a byte-write is detected by state machine 46'. At process block 66, the non-written bytes as determined by the byte-write command 25' are read from their respective devices 36 to provide the non-written bytes on the data lines 18. Next at process block 68, parity is written to the parity device 38' based on all bytes of devices 36'.

The above description has been that of a preferred embodiment of the present invention. It will occur to those that practice the art that many modifications may be made without departing from the spirit and scope of the invention. For example, the same techniques may be used to construct a parity system that works with multiple byte "writes" such as a writing of two bytes or a half word at a time. Clearly other physical divisions of the memory devices into packages are contemplated by the invention including the use of sixteen-bit wide devices. In order to apprise the public of the various embodiments that may fall within the scope of the invention the following claims are made:

We claim:

1. A memory system for use with a processor that write and reads data and parity to and from the memory system, the memory system comprising:

a plurality of individually writeable data elements grouped into writeable memory words to receive data;

at least one individually writeable parity element, the parity element holding multiple parity bits associated with different memory words;

control circuitry communicating with the processor to detect the initiation of a writing operation by the processor of data to at least one memory word and at least one parity bit to an associated parity element, and in response to that detected initiation to:

(a) determined parity bits for data of all the plurality of memory words associated with the associated parity element, to provide multiple parity bits;

(b) release the processor's writing operation; and (c) cause the writing of the multiple parity bits to the associated parity element.

2. The memory system of claim 1 wherein the control circuitry determines the multiple parity bits by:

(i) reading the parity bits from the particular parity element prior to the writing; and (ii) combining the read parity bits and the at least one parity bit to be written in the writing operation to provide the multiple parity bits.

3. The memory system of claim 1 including an address decoder circuit connecting the control circuitry, the data elements, and the parity elements, and causing a reading of a parity element associated with a data element when the data element is read; and wherein the control circuitry operates to read the parity bits from the particular parity element by reading the particular data element.

4. The memory system of claim 1 wherein the control circuitry suspends the writing of the data and the at least one parity bit (step (a) when all data elements associated with the particular parity element are being written to by the processor.

5. The memory system of claim 1 wherein the processor receives a clock signal regulating its operation and wherein the control circuitry suspends the writing of the data to the particular memory element and releases the writing of the data to the particular memory element by interrupting and reestablishing the transmission of the clock signal to the process, respectively.

6. The memory system of claim 1 wherein the data elements and parity elements each store eight bits of information and wherein four data elements are associated with one parity element and wherein each of four parity bits of the parity provides a parity bit for one of the four memory elements.

7. The memory system of claim 1 wherein the control circuitry determines the multiple parity bits by:

(i) reading the data elements other than the particular data element;

(ii) computing parity from the data elements read in step (i) and combining the computed parity with the at least one parity bit.

* * * * *